United States Patent [19]

Gilbertson

[11] 3,722,182
[45] Mar. 27, 1973

[54] AIR PURIFYING AND DEODORIZING DEVICE FOR AUTOMOBILES

[76] Inventor: John E. Gilbertson, 2200 Ashworth Rd., West Des Moines, Iowa 59261

[22] Filed: May 14, 1970

[21] Appl. No.: 37,120

[52] U.S. Cl. ..................55/124, 55/138, 55/145, 55/279, 55/318, 55/385, 55/415, 55/467, 55/510, 98/2.04, 98/2.11
[51] Int. Cl. ..............................................B03c 3/14
[58] Field of Search ............98/2, 2.04, 2.11; 62/244; 55/124, 385, 510, 279, 126, 138, 387, 145, 318, 415, 467; 165/42, 43

[56] References Cited

UNITED STATES PATENTS

| | | | |
|---|---|---|---|
| 1,756,897 | 4/1930 | Bilsky | 123/119 A |
| 2,256,724 | 9/1941 | Onishi et al. | 98/2.03 |
| 2,290,376 | 7/1942 | Marshall | 98/2.11 X |
| 2,672,206 | 3/1954 | Keist | 55/124 X |
| 2,714,808 | 8/1955 | Owen et al. | 62/244 X |
| 2,761,291 | 9/1956 | Golding | 62/244 X |
| 3,259,050 | 7/1966 | Grimm | 98/2.11 |
| 3,472,147 | 10/1969 | Grasseler | 98/2.11 X |
| 3,524,044 | 8/1970 | Liardi | 98/2.09 X |
| 3,572,233 | 3/1971 | Bar et al. | 98/2.09 |
| 1,764,250 | 6/1930 | Falkenthal | 55/127 |
| 2,804,937 | 9/1957 | Poole | 55/103 |
| 3,237,387 | 3/1966 | Haugen et al. | 55/101 X |
| 3,531,150 | 9/1970 | Jahnke | 55/101 X |
| 1,442,619 | 1/1923 | Lamb | 55/124 X |
| 2,017,579 | 10/1935 | Anderson | 165/43 |
| 2,185,486 | 1/1940 | Wahlberg | 165/43 X |
| 2,257,638 | 9/1941 | Moore | 55/387 X |
| 2,873,953 | 2/1959 | Thorne | 165/43 |
| 3,016,108 | 1/1962 | Myddelton | 55/387 |
| 3,027,970 | 4/1962 | Mueller | 55/138 |

FOREIGN PATENTS OR APPLICATIONS

| | | | |
|---|---|---|---|
| 67,389 | 9/1957 | France | 55/124 |
| 948,370 | 2/1964 | Great Britain | 98/2 |

Primary Examiner—Dennis E. Talbert, Jr.
Attorney—Zarley, McKee & Thomte

[57] ABSTRACT

An air purifying and deodorizing device for an automobile comprising a housing positioned on the rear window deck of the automobile and having air intake and air discharge openings. An electronic filtering device is mounted at the air intake opening for removing air-borne particles from the air being taken into the device. A ring-shaped filter device is positioned in the housing for further filtering the air as it passes therethrough. A deodorant cup is positioned within the ring-shaped filter and deodorizes the air as the air passes through the device. An electric fan means is positioned below the rear deck and is adapted to draw the air through the device and to discharge the same through the discharge opening. A directional vent is provided at the discharge opening for directing the discharged air onto the rear window to de-fog the same. An optional purifying and deodorizing device may also be employed which is adapted to supply outside air into the interior of the vehicle and to purify and deodorize the same.

2 Claims, 5 Drawing Figures

PATENTED MAR 27 1973
3,722,182
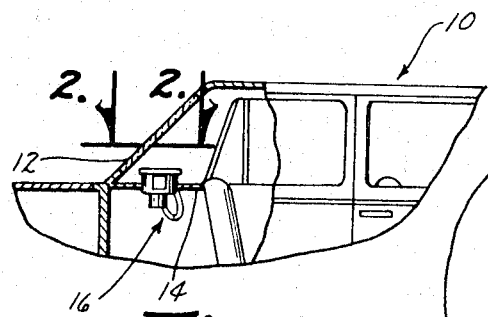
Fig. 1
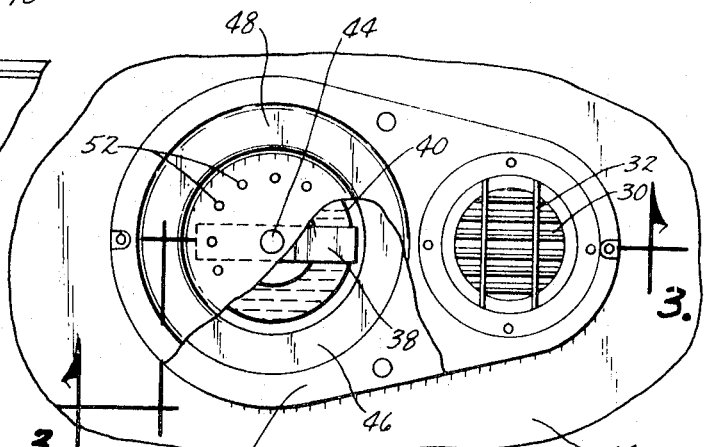
Fig. 2
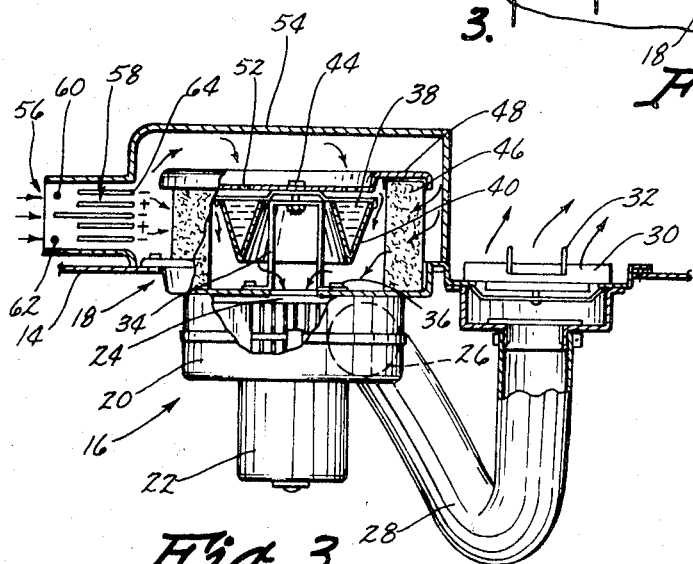
Fig. 3
Fig. 4
Fig. 5
INVENTOR
JOHN E. GILBERTSON
BY
Zarley, McKee & Thomte
ATTORNEYS

AIR PURIFYING AND DEODORIZING DEVICE FOR AUTOMOBILES

Automobiles become quite stuffy in the interiors thereof due to smoke, etc. The windows of the vehicle can be opened to clear the smoke from the interior of the vehicle but the wind noise and wind currents in the vehicle are quite annoying. Further, the opening of the vehicle windows also seriously detracts from the operation of the vehicle air conditioning system.

Therefore, it is a principal object of this invention to provide an air purifying and deodorizing device for an automobile.

A further object of this invention is to provide an air purifying and deodorizing device for an automobile which removes air-borne particles from the air.

A further object of this invention is to provide an air purifying and deodorizing device which not only purifies and deodorizes the air in the vehicle but which also aids in de-fogging the rear window.

A further object of this invention is to provide an air purifying and deodorizing device which may be used to purify and deodorize outside air being brought into the vehicle interior.

A further object of this invention is to provide an air purifying and deodorizing device for an automobile which includes an air directional vent at the discharge opening of the device.

A further object of this invention is to provide an air purifying and deodorizing device for an automobile which is mounted on the rear window deck of the vehicle.

A further object of this invention is to provide an air purifying and deodorizing device for an automobile industry which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a partial side view of the vehicle having the device of this invention mounted in the rear window deck.

FIG. 2 is an enlarged view as seen along lines 2—2 of FIG. 1 with portions thereof cut away to more fully illustrate the invention.

FIG. 3 is a sectional view as seen along lines 3—3 of FIG. 2.

FIG. 4 is an exploded perspective view of the sheltering and deodorizing portions of the device.

FIG. 5 is a partial view similar to FIG. 1 illustrating an optional unit mounted at the forward end of the vehicle interior.

In FIG. 1, the numeral 10 generally refers to a vehicle such as an automobile including a rear window 12 and a rear window deck 14 which extends forwardly from the lower end thereof. The air purifying and deodorizing device of this invention is referred generally to by the reference numeral 16 and is mounted in the deck 14 so that a large portion of the device is positioned below the deck 14 and is positioned in the trunk compartment.

Device 16 comprises a support 18 which is received in an opening formed in the rear deck and secured to the deck by any convenient means such as screws or the like. Fan means 20 is secured to the underside of support 18 and is driven by an electric motor 22 electrically connected to the vehicle electrical system. Fan means 20 has an open upper end 24 which serves as the air intake means and has an air discharge means 26 for discharging air outwardly therethrough. Tubing 28 connects the air discharge means 26 with a directional vent means 30 mounted in the rear deck 14. Vent means 30 includes a rotatable vent member 32 which may be rotated so as to deflect the discharged air in a predetermined direction. Preferably, the vent member 32 will be rotated so that the discharged air will be deflected or directed onto the rear window 12 so as to de-ice or de-fog the same.

Bracket 34 is secured to support 18 by screws 36 and extend upwardly therefrom. Bracket 38 is secured to and extends over the upper end of a deodorant cup 40 by any convenient means such as screws 42. The bracket 38 is secured to the bracket 34 by means of a bolt 44 extending therethrough as will be explained hereinafter. A ring-shaped filter 46 extends around the cup 40 as illustrated in FIG. 3 and is maintained in the position of FIG. 3 by means of a cover element 48 extending over the upper end thereof and being maintained in position by the bolt member 44 extending therethrough. Nut 50 is threadably mounted on the lower end of the bolt member 44 to maintain the parts in the position seen in FIG. 3. Cover 48 is provided with a plurality of openings 52 formed in the upper end thereof to permit air to be drawn downwardly therethrough across the deodorant cup 40 so that the incoming air will be deodorized by the deodorant in the cup 40. The deodorant in the cup 40 may be liquid, paste, etc. As seen in FIG. 3, the sides of the filter 46 are exposed to permit the flow of air therethrough so that the filter 46 will filter the air passing therethrough.

Cover 54 extends over the filter and encloses the same as illustrated in the drawings. Cover 54 is provided with an intake opening 56 through which the incoming air is passed. The numeral 58 refers generally to an electronic filtering means which is provided at the intake opening 56 so that the incoming air is electronically filtered. The numerals 60 and 62 generally refer to 5000 volt wires which impart a positive charge to the air-borne particles in the incoming air. The numeral 64 refers to a plurality of spaced-apart aluminum plates which are positioned inwardly of the wires 60 and 62. Each of the plates have a positive or negative charge and are alternately disposed so that a pair of negative plates are separated by a positive plate.

In operation, the device would be activated by a suitable switch provided in the automobile so as to energize the electronic filter 58 and so as to energize the electric motor 22 to cause the air to be drawn inwardly through the electronic filter 58. The air passes between the wires 60 and 62 which impart a positive charge to the air-borne particles. As the charged particles pass between the plates 64, the positively charged particles are attracted to the plates 64 having a negative charge. The plates 64 having a positive charge tend to deflect or divert the positively charged particles towards the plates having a negative charge. The particles in the incoming air are thus attracted to the plates 64 having a negative charge and remain thereon so that the incoming air is electronically filtered. The electronically filtered air is then drawn inwardly through the filter 46 to further filter the air. A certain amount of the air is also drawn through the openings 52 across the deodorant as previously described. The air is drawn inwardly through the fan means 20 and is discharged outwardly through the vent means 30 onto the rear window of the vehicle so as to de-ice or de-fog the same. As the vehicle is being operated, the device continually purifies and deodorizes the air in the vehicle so as to remove odors, smoke, etc. from the air. The air in the vehicle will be continually circulated by the device and will be continually deodorized and purified to provide the occupants of the vehicle with clean air.

FIG. 5 illustrates a vehicle 10 having an auxiliary device 16' provided at the forward end of the passenger compartment. The device 16' is identical to the device 16 except that a cover 66 extends over the device which is in communication with the outside air by means of a conduit 68. The device 16' permits outside air to be drawn into the vehicle and deodorized and purified as it is being introduced into the interior of the vehicle. The device 16 at the rear deck of the vehicle will continually clean the air that is in the interior so as to remove smoke, etc. therefrom.

Thus it can be seen that an extremely efficient and unique device has been provided for purifying and deodorizing the air in the interior of an automobile. Therefore, it can be seen that the device accomplishes at least all of its stated objectives.

I claim:
1. A device of the kind described comprising:
a vehicle having a rear window with a rear deck positioned forwardly of the lower end of the rear window, said deck having an opening therein;
an air purifying device having an air intake opening and an air discharge opening both in communication with the interior of said vehicle;
support means mounted in said opening of said deck, and
said air purifying device mounted on said support means and comprising an electronic filter adjacent said intake opening, a ring-shaped filter, a deodorizing device, and a fan;
said fan being positioned below said support means and said electronic filter, said ring shaped filter, and said deodorizing device being positioned above said support means;
said fan comprising an intake means adapted to draw air from said air intake opening and said fan further comprising an air discharge means for discharging air outwardly therethrough;
means connecting said discharge means of said fan to said discharge opening for directing air outwardly through said discharge opening;
said ring shaped filter and said deodorizing device being positioned in the path of air moving from said intake opening towards said fan;
said deodorizing device containing a deodorizing agent which deodorizes the air as it passes over said deodorizing device; and
an air directional vent provided on said discharge opening for permitting the discharged air to be selectively directed.

2. In combination,
a vehicle having a rear window with a rear deck positioned forwardly of the lower end of the rear window,
a support means mounted in an opening formed in said rear deck,
an air purifying device mounted on said support means and having an air in-take opening in communication with the interior of the vehicle and an air discharge opening in communication with the interior of the vehicle, an air purifying means on said device to purify the air as it passes through the device, said air purifying device comprising a filter means located above said support member, an air fan means located below said support member and operatively connected to said means for drawing air through said air purifying device, and means for directing air through said filter means and said support plate, thence through said air fan means, and thence upwardly through an air discharge opening in said support means,
an air deodorizing means mounted on said support plate to deodorize the air as it passes through said device,
a directional vent being provided on said discharge opening to permit the discharged air to be selectively directed onto said rear window,
said air purifying means comprising an electronic air filtering means adapted to remove air-borne particles from the air passing through the device,
a second air purifying device in said vehicle having an air intake opening in communication with the atmosphere outside of the interior of said vehicle, said second device having an air discharge opening in communication with the interior of said vehicle, means on said second device for passing air therethrough, purifying means on said second device to purify the air as it passes therethrough, deodorizing means on said second device for deodorizing the air passing therethrough, said air purifying means comprising a ring-shaped filter means.

* * * * *